(12) United States Patent
Nagliati

(10) Patent No.: US 12,415,407 B2
(45) Date of Patent: Sep. 16, 2025

(54) WINDSHIELD FOR A MOTOR VEHICLE

(71) Applicant: FERRARI S.P.A., Modena (IT)

(72) Inventor: Gian Luca Nagliati, Modena (IT)

(73) Assignee: FERRARI S.P.A., Modena (IT)

( * ) Notice: Subject to any disclaimer, the term of this patent is extended or adjusted under 35 U.S.C. 154(b) by 380 days.

(21) Appl. No.: 18/170,592

(22) Filed: Feb. 17, 2023

(65) Prior Publication Data

US 2023/0264542 A1 Aug. 24, 2023

(30) Foreign Application Priority Data

Feb. 24, 2022 (IT) .......................... 102022000003431

(51) Int. Cl.
*B60J 1/06* (2006.01)
*B60J 1/00* (2006.01)
(Continued)

(52) U.S. Cl.
CPC ................. *B60J 1/008* (2013.01); *B60J 1/02* (2013.01); *B60J 10/34* (2016.02); *B60J 10/70* (2016.02); *B60R 13/025* (2013.01); *B62D 25/04* (2013.01)

(58) Field of Classification Search
CPC ... B60J 1/002; B60J 1/007; B60J 1/008; B60J 1/06
(Continued)

(56) References Cited

U.S. PATENT DOCUMENTS

| | | | | |
|---|---|---|---|---|
| 5,772,277 | A * | 6/1998 | Fukuda | .................. B62D 25/04 296/146.15 |
| 7,641,269 | B2 * | 1/2010 | Matsumoto | ............ B62D 25/04 296/193.06 |

(Continued)

FOREIGN PATENT DOCUMENTS

| | | | | |
|---|---|---|---|---|
| CN | 103459174 | B * | 6/2016 | ....... B29C 45/14434 |
| EP | 1827881 | A1 | 9/2007 | |
| JP | S6088631 | A | 5/1985 | |
| JP | 4762732 | B2 | 8/2011 | |
| JP | 6568603 | B2 * | 8/2019 | ............... B60R 1/00 |

OTHER PUBLICATIONS

CN103459174 Text (Year: 2016).*
JP6568603 Text (Year: 2019).*
Italian Search Report for Application No. 102022000003431; Filing Date—Feb. 24, 2022; Date of Mailing—Sep. 28, 2022, 8 pages.

* cited by examiner

*Primary Examiner* — Dennis H Pedder
(74) *Attorney, Agent, or Firm* — CANTOR COLBURN LLP

(57) ABSTRACT

A windshield for a motor vehicle is described, comprising: a frame with a first rim defining a first opening, and a first window engaging the first opening, supported by the first rim; the frame comprises, in turn, a first and a second cross member opposite one another; and one pair of first pillars opposite one another and extending crosswise to the first and second cross member; the first and second cross member and said pillars delimit said first rim; the frame comprises a second rim and a third rim distinct from one another and arranged on respective opposite sides of the first rim; the frame comprises a pair of third cross members smoothly joined to the first cross member by respective opposite side bands of the first cross member; and a pair of fourth cross members smoothly joined to the second cross member; the second rim is delimited by the first pillar, by a respective third cross member and by a respective fourth cross member; the third rim is delimited by the second pillar, by a respective third cross member and by a fourth cross member.

8 Claims, 3 Drawing Sheets

(51) Int. Cl.
*B60J 1/02* (2006.01)
*B60J 1/10* (2006.01)
*B60J 10/34* (2016.01)
*B60J 10/70* (2016.01)
*B60R 13/02* (2006.01)
*B62D 25/04* (2006.01)

(58) Field of Classification Search
USPC .................................. 296/84.1, 96.18, 21, 12
See application file for complete search history.

(56) References Cited

U.S. PATENT DOCUMENTS

| | | | |
|---|---|---|---|
| 9,216,635 B2 * | 12/2015 | Medina | ..................... B60J 1/004 |
| 10,293,663 B2 | 5/2019 | Andersson et al. | |
| 11,155,307 B2 * | 10/2021 | Ikeda | ..................... B62D 25/04 |
| 2020/0139793 A1 * | 5/2020 | Nakamura | ............... B60J 1/008 |
| 2020/0339199 A1 | 10/2020 | Takahashi et al. | |

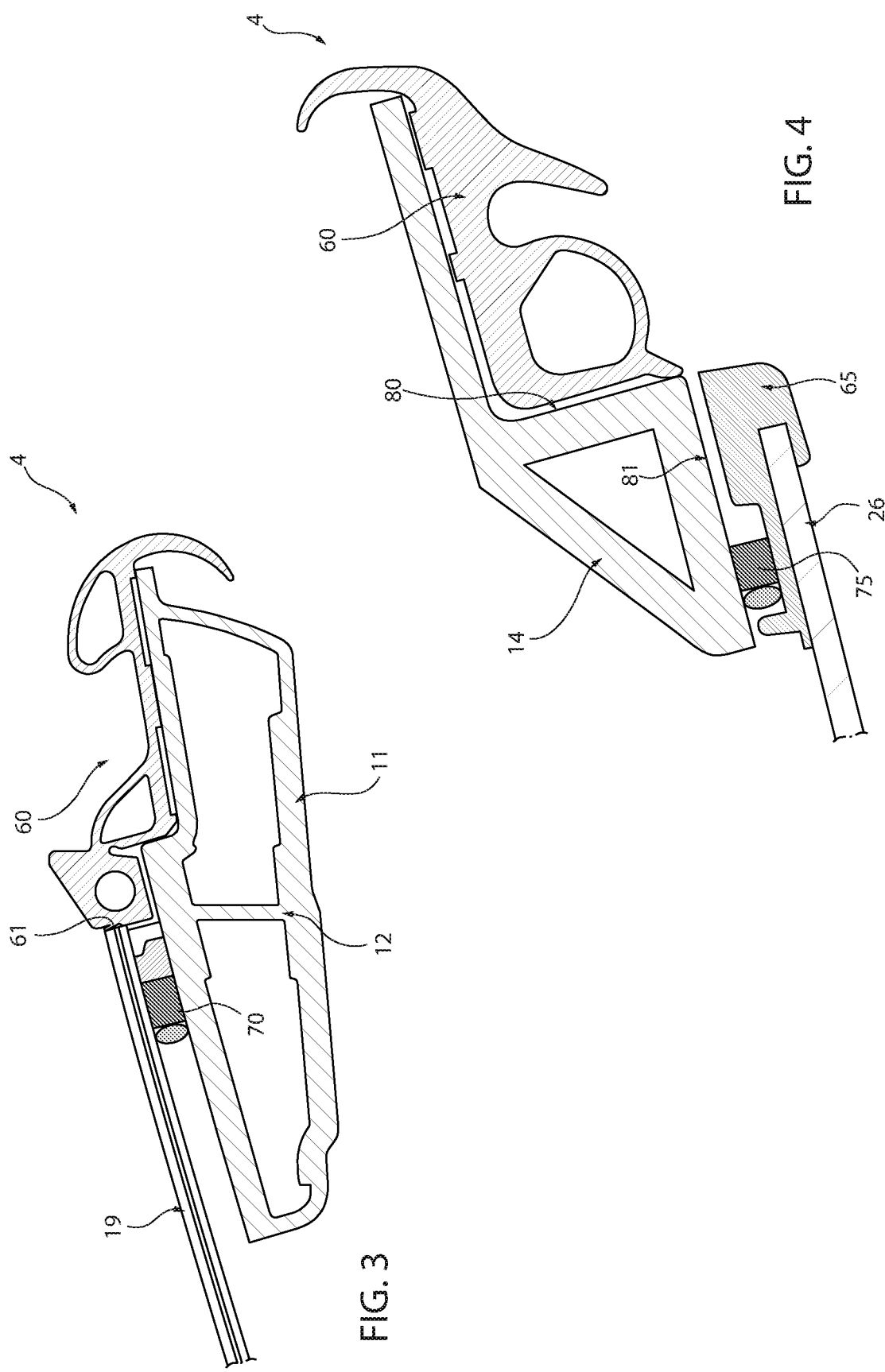

WINDSHIELD FOR A MOTOR VEHICLE

CROSS-REFERENCE TO RELATED APPLICATIONS

This patent application claims priority from Italian patent application no. 102022000003431 filed on Feb. 24, 2022, the entire disclosure of which is incorporated herein by reference.

TECHNICAL FIELD

This invention relates to a windshield for a motor vehicle and to a motor vehicle comprising this windshield.

BACKGROUND

Motor vehicles comprising a body defining a passenger compartment and a windshield arranged at the front of the passenger compartment are known.

Sports cars with an uncovered passenger compartment defining a frame and a windshield shaped like a dome fixed to the frame have also been developed in the past.

In particular, the dome-shaped windshield extends wholly both at the front and to the side of the passenger compartment so as to improve the aerodynamic properties of the race car.

Being intended for race cars, the use of a dome-shaped windshield did not need to meet compliance, assembly safety, or aesthetic constraints.

In the sector, there is the need to use, for stylistic reasons, dome-shaped windshields on standard motor vehicles, meeting the typical technical requirements of standard motor vehicles.

In particular, there is the need in the sector to produce the dome-shaped windshield so as to enable adequate visibility from inside the passenger compartment and to enable its shattering in the event of a collision.

In addition, the need is felt in the sector to glue the windshield to the frame using a bead of adhesive material without letting the adhesive material fall, or limiting this.

SUMMARY

The purpose of this invention is to produce a windshield for a motor vehicle, which makes it possible to meet the need mentioned above.

The above-mentioned purpose is achieved with this invention, as it relates to a windshield for a motor vehicle according to what is defined in claim 1.

BRIEF DESCRIPTION OF THE DRAWINGS

In order to better understand this invention, a non-limiting preferred embodiment thereof will now be described by way of example with reference to the accompanying drawings, in which:

FIGS. 2 to 4 are respective cross-sections on a greatly enlarged scale of the windshield in FIG. 1 according to the respective lines II-II; III-III and IV-IV.

DESCRIPTION OF EMBODIMENTS

Figure 1:
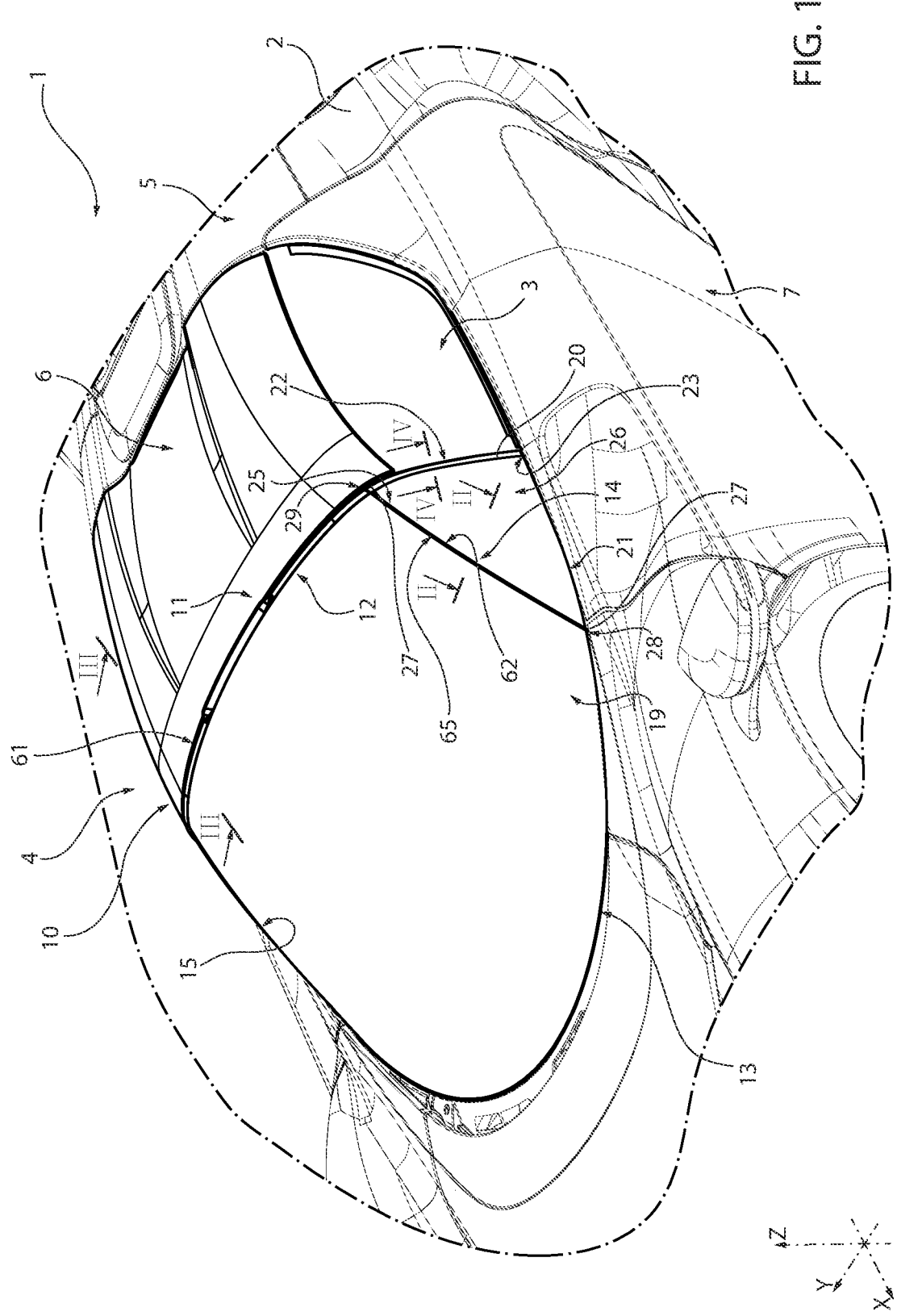
FIG. 1 is a perspective view of a motor vehicle with a windshield produced according to the precepts of this invention.

With reference to the attached figures, reference number 1 indicates a motor vehicle comprising a body 2 defining a passenger compartment 3.

The motor vehicle 1 is, in the case illustrated, a standard motor vehicle.

It should be specified that, below in this description, expressions such as "above", "below", "in front of", "behind" and the like are used with reference to the normal movement of the motor vehicle 1.

It should also be specified that, below in this description, the expression "concave" ("convex") region is used to indicate a two-dimensional or three-dimensional region shaped so that at least one segment exists (or none exist) joining two points of the region that does not entirely belong to the same region.

It should, finally, be specified that below in this description the expression segment with an upwards ("downwards") concavity is used to indicate a segment or a single-dimensional curve shaped so as to be located above (below) any tangent to the segment or curve itself.

The passenger compartment 3 is delimited at the front by a windshield 4 and behind by a backrest 5.

The passenger compartment 3 is also delimited above by a roof 6.

The roof 6 extends between the backrest 5 and the windshield 4.

The motor vehicle 1 comprises, in addition, a pair of doors 7 hinged to the body 2 and moveable between:

a closed position in which they delimit, to the side, the passenger compartment 3 and prevent entry into/exit from the passenger compartment 3; and an open position in which they enable entry into/exit from the passenger compartment 3.

It is also possible to define:

a longitudinal axis X integral with the motor vehicle 1, arranged, in use, horizontal and parallel to a normal direction of travel of the motor vehicle 1;

a transversal axis Y integral with the motor vehicle 1, arranged, in use, horizontal and orthogonal to the axis X; and an axis Z integral with the motor vehicle 1, arranged, in use, vertical and orthogonal to the axes X, Y.

More specifically, the windshield 4 comprises, in turn:

a frame 10 comprising a rim 11 defining an opening 12; and a front window 19 engaging the opening 12 supported by the rim 11 and arranged in front in relation to a normal forward moving direction parallel to the direction X.

More specifically, the rim 11 is quadrangular shaped and comprises:

a pair of upper and lower cross members 12, 13 opposite to each other; and a pair of side pillars 14, 15 opposite one another and extending crosswise between corresponding ends of the cross members 12, 13.

The cross members 12, 13 have an extension mainly parallel to the axis Y.

The first cross member 13 is arranged behind the second cross member 12.

Advantageously, the frame 10 comprises a pair of rims 20 distinct from one another and arranged on respective opposite sides of the rim 10; the rims 20 delimit respective openings 25; the windshield 4 comprises, in addition, a pair of side windows 26 engaging respective openings 25, supported, respectively, by the rims 20 of the frame 10, and arranged to the side with reference to the normal forward moving direction of the motor vehicle 1;

the frame 10 comprises, in addition:
- a pair of cross members 22 smoothly joined to the cross member 12 and arranged by respective opposite side bands of the cross member 12; and
- a pair of cross members 21 smoothly joined to the cross member 13 and arranged by respective opposite side bands of the cross member 13;
- each rim 20 is delimited by a respective pillar 14, 15, by a respective cross member 12, and by a respective second cross member 13.

In particular, the windows 19, 26 are tangent to each other.

The cross members 21, 22 are joined to the corresponding cross members 12, 13 without forming sharp edges.

The cross members 21, 22 of each rim 20 comprise:
- first ends 23 connected to each other; and
- second ends connected to a corresponding end of the cross member 12 and a corresponding end of the second cross member 13.

The cross members 21, 22 of each rim 20 preferably form a straight angle having a vertex on the corresponding end 23.

Each rim 20 is triangular.

The rims 11 and 20 are concave.

The cross member 12 has a concavity facing downwards.

The cross member 13 has a concavity facing backwards.
- a ring-shaped gasket 60 surrounding the window 15 and interposed between the window 19 and the rim 11 (FIGS. 3 and 4); and
- a pair of gaskets 65 comolded on the windows 26 (only one of which is illustrated in FIG. 1).

The window 19 is glued to the rim 11. The windows 26 are glued to the corresponding rims 20.

Figure 2:
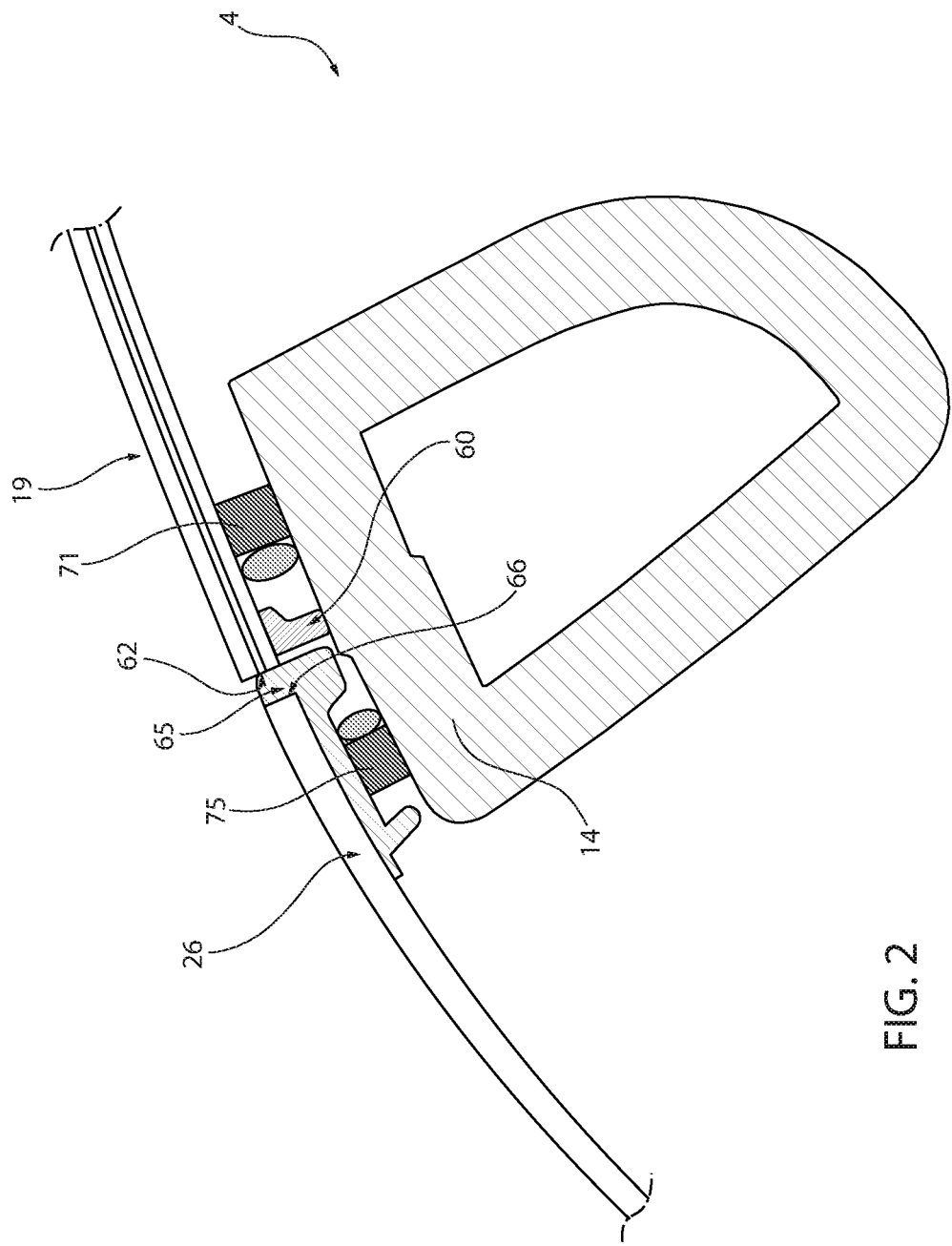

More specifically, the window 19 is glued to the pillars 14, 15 using a bead 71 of adhesive (FIG. 2).

The windows 26 are glued to the pillar 14, 15 using a bead 75 of adhesive (FIGS. 2 and 4).

With reference to FIG. 3, the window 19 comprises an upper edge 61 abutting against the gasket 60 and glued to the cross member 12 using an adhesive bead 70.

With reference to FIG. 2, the window 19 comprises a side edge 62 arranged so it abuts against the gasket 65 and glued to the pillar 14 using the bead 71.

Each gasket 65 is, in addition, comolded on a side end edge 66 of the corresponding window 19.

With reference to FIG. 4, the gasket 60 and each gasket 65 are arranged at corresponding adjacent sides of the corresponding pillar 14, 15.

In particular, the windows 26 are made of tempered glass.

The window 15 is made of a multi-layer material formed from a pair of laminated glass plates between which a film of plastic material, especially polyvinyl butyral, is interposed.

The assembly of the windshield 4 occurs by interposing the gasket 60 between the window 19 and the rim 11, and gluing the window 19 to the rim 11 using the beads 70, 71.

The windows 26 with the corresponding comolded gaskets 65 are then glued to the pillars 14 using respective beads 75, until interposing each gasket 65 between the window 19 and the corresponding window 26.

In particular, the concave windows 19, 26 are brought near the frame 10 after the application of the adhesive forming the beads 70, 71, 75 using a movement perpendicular to the frame 10 that compresses the beads 70, 71, 75 and limits—or even eliminates—the risk of their falling from the frame 10.

The windshield 4 comprises, in one embodiment, multiple accessories (not illustrated in the attached figures), in particular a rear-view mirror and/or a roof lamp, fixed to the windshield 19.

The frame 10 is made of carbon fibre.

The advantages enabled by the windshield 4 according to this invention will be apparent from an examination thereof.

In particular, the frame 10 defines both the rim 11 for the window 19 and the rims 20 for the corresponding windows 26.

In this way, it is possible to produce a dome-shaped frame 10, meeting, at the same time, the legal and technological requirements typical of the standard motor vehicle 1.

This enables, on the one hand, the production of the window 19 in a multi-layer material that ensures correct visibility from the inside of the passenger compartment 3 and limits the risk of shattering in the event of a collision, and, on the other hand, the production of the windows 26 made of tempered glass since the latter do not need to meet stringent requirements regarding visibility and limiting the risk of shattering.

Thanks to the fact that the windows 19, 26 are separate from each other, it is possible to bring the windows 19, 26 near the frame 10 after having applied the beads 70, 71, 75 using a movement that is basically perpendicular to the beads 70, 71. It is, thus, possible to glue the concave windows 19, 26, limiting the risk of the adhesive substance's sliding from the frame 10.

The gaskets 60, 65 are interposed between the window 19 and the windows 26, preventing direct contact thereto. In this way, the fluid tightness is significantly improved.

The gaskets 65 are comolded on the corresponding windows 26, simplifying the assembly thereof and improving the finish and geometric precision thereof.

Finally, it is clear that changes may be made to the windshield 4, and variations produced thereto, according to this invention that, in any case, do not depart from the scope of protection defined by the claims.

The invention claimed is:
1. A windshield (4) for a motor vehicle (1), comprising:
- a frame (10) comprising a first rim (11), which defines a first opening (15); and
- a first window (19) engaging said first opening (15), supported by said first rim (11) and arranged at the front, with reference to a normal forward moving direction of said motor vehicle (1);
- said frame (10) comprising, in turn:
- a first and a second cross member (12, 13) opposite one another and extending, in use, crosswise to said forward moving direction; and
- a pair of first pillars (14, 15) opposite one another and extending crosswise to said first and second cross member (12, 13);
- said first and second cross member (12, 13) and said pillars (14, 15) delimiting said first rim (11);
- wherein said frame (10) further comprises a second rim and a third rim (20) distinct from one another and arranged on respective opposite sides of said first rim (10);
- said second and third rim (20) delimiting a second opening and a third opening (25), respectively;
- said windshield (4) further comprising:
- a second and a third window (26) engaging said second and third opening (25), respectively, supported by said second and third rim (20) of said frame (10), respec- tively, and arranged laterally with reference to said normal forward moving direction of said motor vehicle (1);

said frame (10) further comprising:

a pair of third cross members (22) smoothly joined to said first cross member (12) by respective opposite side bands of said first cross member (12);

a pair of fourth cross members (21) smoothly joined to said second cross member (13) by respective opposite side bands of said second cross member (13);

said second rim (20) being delimited by said first pillar (14), by a respective third cross member (22) and by a respective fourth cross member (21);

said third rim (20) being delimited by said second pillar (15), by a respective third cross member (22) and by a respective fourth cross member (21)

a first gasket (60) shaped like a ring fitted onto said first window (19) and interposed between said first window (19) and said first rim (11); said first window (19) being glued to said first rim (11) in the are of a first gluing bead (70, 71); and a second gasket (65) comolded on said second window (26 and glued to said first pillar (14) in the area of a second gluing bead (75), wherein said second gasket is interposed between said second window (26) and said first window (19), said first window (19) further comprising an upper edge (61) abutting against said first gasket (60) and glued to said first cross member (12) using said first gluing bead (70), a side edge (62) arranged so it abuts against said second gasket (65) and glued to said first pillar (14) using a third gluing bead (71), said second gasket being comolded on a side end edge (66) of said second window (26), said first gasket (60) and said second gasket (65) being arranged at corresponding adjacent sides of the corresponding first pillar (14).

2. The windshield according to claim 1, wherein said first rim (10) has a quadrangular shape and said second rim (20) has a triangular shape.

3. The windshield according to claim 1, wherein said third and fourth cross member (22, 21) of a said second and third rim (20) comprise respective first ends (23) connected to one another;

each third cross member (22) comprising a respective second end opposite the respective first end (23) and connected to said first cross member (12);

each fourth cross member (21) comprising a respective second end opposite the respective first end (23) and connected to said second cross member (13).

4. The windshield according to claim 1, wherein said first rim (10) is concave and/or said second and third rims (20) are concave.

5. The windshield according to claim 1, wherein said first cross member (12) has a concavity facing said second cross member (13) and said second cross member (13) has a concavity facing said first cross member (12).

6. The windshield according to claim 1, wherein at least one of said second and third window (26, 36) is made of tempered glass; and/or wherein said first window (19) is made of a pair of laminated glass plates, between which a film of plastic material is interposed.

7. A motor vehicle (1) comprising:
a body (2) defining a passenger compartment (3); and
a windshield (4) according to claim 1 and arranged at the front of said passenger compartment (3).

8. The motor vehicle according to claim 7, wherein the motor vehicle further comprises a plurality of accessories fixed to said first window (19) of said windshield (4).

* * * * *